United States Patent [19]

Hollowell et al.

[11] 4,344,588
[45] Aug. 17, 1982

[54] SEAT BELT RETRACTOR ASSEMBLY WITH POST EMERGENCY SPOOL RELEASE

[75] Inventors: William Hollowell, Pacific Palisades; Akira Tanaka, Northridge; Avraham Ziv, Sepulveda; Nazareth Stamboulian, Los Angeles, all of Calif.

[73] Assignee: American Safety Equipment Corp., New York, N.Y.

[21] Appl. No.: 193,957

[22] Filed: Oct. 6, 1980

[51] Int. Cl.³ .................. A62B 35/02; B65H 75/48
[52] U.S. Cl. ...................... 242/107.4 A; 280/806
[58] Field of Search .............. 242/107.4 R-E, 242/107.6; 280/801-808; 297/475-480

[56] References Cited

U.S. PATENT DOCUMENTS

| | | | |
|---|---|---|---|
| 3,504,336 | 3/1970 | Boblitz | 242/107.4 R |
| 4,083,581 | 4/1978 | Clifford | 280/803 |
| 4,090,735 | 5/1978 | Czernakowski | 242/107.4 A X |
| 4,234,209 | 11/1980 | Ikesue | 242/107.4 A X |
| 4,235,391 | 11/1980 | Steger | 242/107.4 A |
| 4,245,798 | 1/1981 | Steger | 242/107.4 A |
| 4,265,415 | 5/1981 | Harrell et al. | 242/107.4 A |
| 4,277,037 | 7/1981 | Loose et al. | 242/107.4 A |

*Primary Examiner*—John M. Jillions
*Attorney, Agent, or Firm*—Poms, Smith, Lande & Rose

[57] ABSTRACT

An emergency spool release for use with a seat belt retractor mechanism is shown wherein the seat belt mechanism includes a spool for storing a belt which restrains the passenger of a vehicle during an emergency. The belt is urged into a retracted position by spring means while the protracted position of the belt is restrained in an emergency by the automatic engagement of a locking pawl against ratchet teeth found on the periphery of the spool. The automatic engagement is accomplished by an inertia locking system. In some situations, the automatic inertia locking system does not disengage thereby making it difficult to accomplish further protraction of the seat belt in a post emergency situation. The locking pawl in the seat belt mechanism of this invention is capable of a rotational motion to engage the ratchet teeth under the urging of the inertia locking device. It is also capable of a transverse motion under the urging of a manual unlocking device for post emergency release. Transverse motion of the locking pawl is accomplished by a lever which is attached to the locking pawl and spring biased into the automatic position. Actuation of a lever either manually or by a second lever mechanism causes the transverse motion of the locking pawl to unlock the seat belt mechanism in the post emergency condition.

11 Claims, 8 Drawing Figures

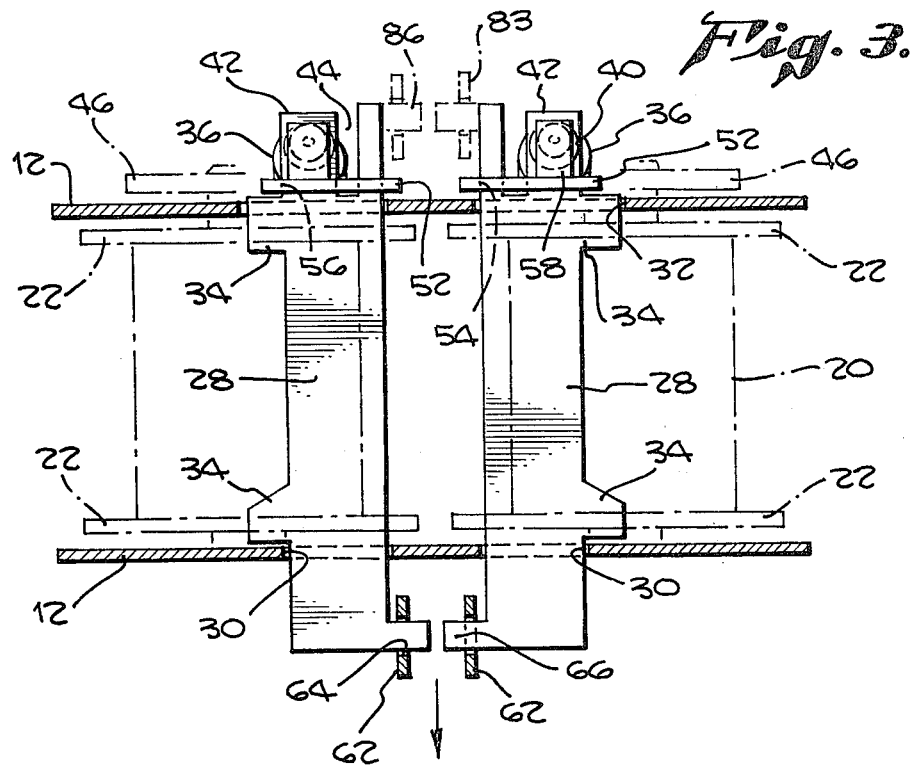

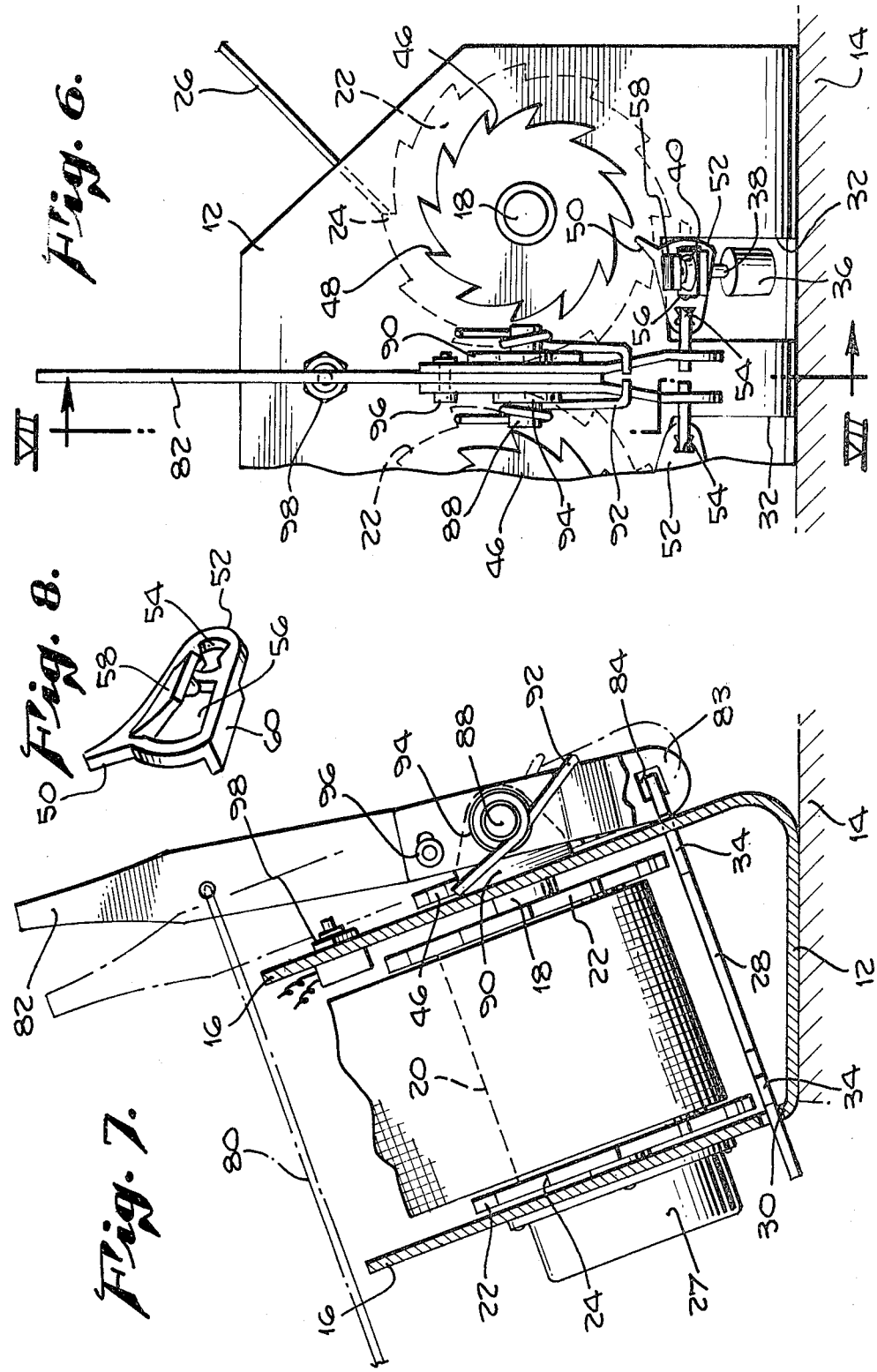

SEAT BELT RETRACTOR ASSEMBLY WITH POST EMERGENCY SPOOL RELEASE

BACKGROUND OF THE INVENTION

The present invention relates to emergency seat belt mechanisms and, more particularly, to an emergency seat belt mechanism having automatic inertia locking during an emergency condition with manual release during a post emergency condition.

Emergency locking safety belt retractors used in vehicles for storing a safety belt thereon and for allowing unreeling of the safety belt from the retractor to permit the belt to be placed about and thus restrain a passenger during an emergency are known. These retractors allow the uncoiling of a safety belt at all times except during a crash or other emergency situation when the belt locks to prevent its further protraction. The locking is accomplished by an inertia-sensitive safety retractor lock which includes an inertia mass that responds to a crash or sudden deceleration of the vehicle in which it is mounted. This deceleration causes the inertia mass to actuate a locking pawl which engages ratchet teeth upon a spool that stores the safety belt.

As safety belts have been utilized for several years within vehicles of all types, the simple belt with a buckle and belt adjustment first utilized years ago has been replaced by evermore complex and intricate mechanisms. For example, the inertia mass which automatically locks the safety belt and prevents further protraction came about after spring-loaded safety belts were first introduced. Spring retraction of safety belts was introduced because users became annoyed with the loose belts laying about a vehicle. Annoyance with a device leads to removal of the device. Removal of such a safety device clearly is not the desire of manufacturers of vehicles within which the device is used. Accordingly, spring retraction was developed.

Spring retracted devices required locking at some protracted position to prevent further protraction during an emergency deceleration. First approaches allowed the user of a safety belt to extend the belt to a given position wherein it was locked from further protraction. Once the user of this so called automatic locking retractor placed the belt about his or her body, the belt had a tendency to continually retract while the latch within the seat belt mechanism prevented further protraction. This "cinching" effect became quite uncomfortable and contributed to a lack of use of the seat belt.

This cinching effect was eliminated through the utilization of a so called vehicle sensitive retractor in which a continuously protractable seat belt is prevented from further protraction by inertia locking during an emergency deceleration of the vehicle. During an emergency stop, an inertia mass has been used to cause the displacement of a locking pawl into a locking position against the ratchet teeth on a seat belt spool. See U.S. Pat. No. 2,708,966 which issued May 24, 1955 entitled Inertia-Operated Safety Equipment by R. L. Davis.

Experience has taught that it is possible for the locking pawl to engage the tip of a ratchet tooth and thus bounce back from a locking position. Several inertia devices have been proposed to eliminate this bouncing problem. See for example, U.S. Pat. No. 3,889,898 which issued June 17, 1975 by A. Ziv entitled Piggyback Dual Lock Bar, assigned to the assignee of the present invention. See also U.S. Pat. No. 3,930,622 which issued Jan. 6, 1976 and U.S. Pat. No. 3,937,416 which issued Feb. 10, 1976, each of which are assigned to the assignee of the present invention.

These prior art seat belt systems have generally required the user to manually adjust the seat belt by protraction or other adjustment before operating the vehicle in which the user was riding. Such systems, referred to as active systems, have created some annoyance which, as in earlier prior art systems, resulted in lack of use. To overcome this problem, passive seat belt systems have been developed which require no adjustment by the user. An example of a passive seat belt system is shown in U.S. Pat. No. 4,245,856 entitled "Emergency Release for Passive Seat Belt Systems" by A. Ziv which is assigned to the same assignee as the present invention.

In either a passive or active seat belt system it has been found that automatic inertia locking to prevent further protraction of the belt during an emergency can create some difficulty in a post emergency situation. For example, if the vehicle were to be turned upside down or if the user were to apply continuous pressure against the seat belt, such pressure or position might lock the automatic inertia system thus preventing further protraction of the belt. It is also desirable to provide a second method for releasing a seat belt mechanism beside release of a buckle in a post emergency condition.

SUMMARY OF THE INVENTION

Accordingly, it is an object of the present invention to provide a post emergency release for the spool locking mechanism of a seat belt retractor.

It is another object of the present invention to provide a post emergency spool release which may be easily actuated from several positions through several convenient mechanisms.

In accomplishing these and other objects, the present invention utilizes a locking pawl which may be urged into a locked position by an automatic inertia locking system the unique features of which are claimed in a co-pending patent application Ser. No. 193,958, filed Oct. 6, 1980, by A. Tanaka, assigned to the same assignee as the present invention. The locked position is generally obtained by the rotational motion of the locking pawl about its longitudinal axis. The present invention provides a locking pawl which is also capable of a transverse motion along its longitudinal axis. The teeth of the locking pawl which engage the ratchet teeth formed upon the seat belt spool are provided with a limited width such that the transverse motion of the locking pawl removes the teeth from engagement with the seat belt spool thus freeing the spool for rotational motion. A spring-biased lever is used to urge the locking pawl into a transverse motion. The spring-biased lever may be actuated by either manually actuating an extended portion of the lever or by manually actuating a remote emergency release handle coupled to the spring-biased lever by an actuator rod or flexible cable.

DESCRIPTION OF THE DRAWINGS

Other objects and advantages of the present invention will become apparent to those skilled in the art after review of the accompanying drawings wherein:

FIG. 3 is a plane sectional view taken along line III—III of FIG. 1;

FIG. 4 is a plane sectional view, similar to FIG. 3, showing a locking pawl of the present invention moved transversely from its normal position;

FIG. 5 is a segmented end view of the seat belt retractor mechanism shown in FIG. 1 taken from the opposite end of the mechanism showing a locking pawl rotated about its longitudinal axis from its normal position;

FIG. 6 is an end view, similar to FIG. 1, showing the opposite end of the seat belt retractor mechanism with a second embodiment of a manual release mechanism;

FIG. 7 is a side view taken along line VII—VII of FIG. 6; and

FIG. 8 is a perspective view showing a second locking pawl used in the present invention.

DESCRIPTION OF THE PREFERRED EMBODIMENT

Figure 2:
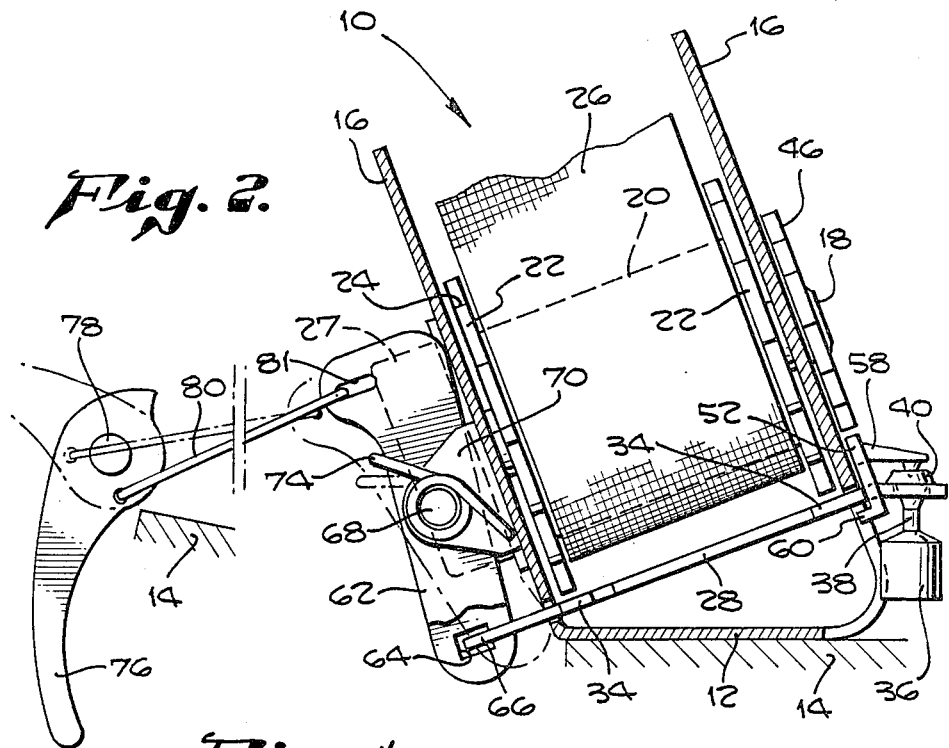
FIG. 2 is a side cross-sectional view taken along line II—II of FIG. 1.
Figure 1:
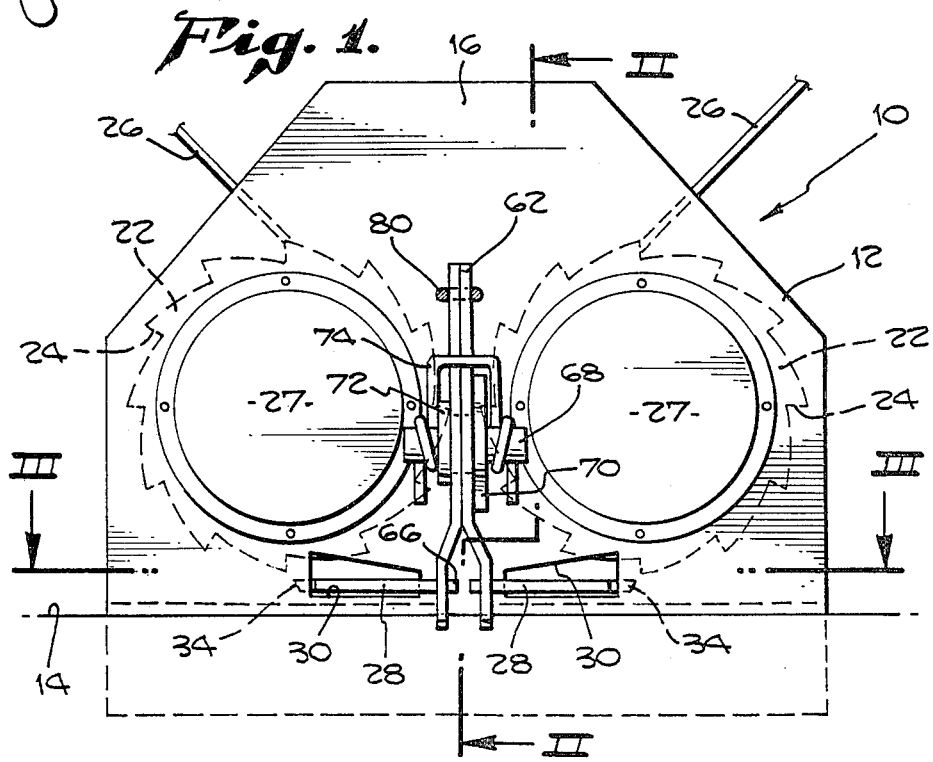
FIG. 1 is an end view showing a seat belt retractor mechanism incorporating the present invention.

Referring now to the drawings, FIG. 1 shows a seat belt retractor mechanism 10 including a housing 12 formed from a stamped metal sheet mounted upon a vehicle frame 14, FIG. 2. It will be seen in FIG. 2 that the housing 12 is formed with its base parallel to the frame of the vehicle and its oppositely extending arms 16 bent at an angle to the frame 14. Mounted between the arms 16 is a spool shaft 18 which rotatably mounts a spool 20 formed with spool ends 22 having ratchet-like teeth 24 on the periphery of each spool end.

Mounted upon the spool 20 between ends 22 is a seat belt 26 which may be protracted from the spool 20 by the user in an active seat belt system or by the opening of the vehicle door in a passive seat belt system. It will be noted that the base of the housing 12 is arranged at an angle to the arms 16 to permit the shaft 18 and spool 20 to be arranged at a suitable angle. This permits the seat belt 26 to be protracted from its spool 20 and about the user at a comfortable angle. Further, the seat belt retractor mechanism 10 is shown with two seat belt retractor spools since most vehicles, such as the automobile, have side-by-side seating arrangements. Clearly, the seat belt retractor mechanism of the present invention may be utilized with but a single spool 20 and belt 26.

Under the urging of a spring, not shown, mounted within a spring housing 27, the spool 20 continuously retracts the belt 26. A spring housing device which reduces the torsional force exerted by the spring to improve the comfort of the user is shown in U.S. Pat. No. 4,026,494 which issued May 31, 1977 entitled Safety Belt Tension Reducing Means by A. Tanaka, assigned to the assigned to the assignee of the present invention. The specification of this application as its relates to the adjustment of retraction torque is incorporated herein by reference.

As the seat belt retractor mechanism of the present invention is in a continuous state of adjustment due to the lack of a manual locking mechanism, it is desirable to use an automatic inertia locking system formed by a locking pawl 28 mounted between the housing arms 16 within suitable apertures 30, FIG. 1, and 32, FIG. 5. The locking pawl is formed from a planar sheet of metal with its longitudinal axis substantially longer than its lateral axis. The pawl 28 passes through apertures 30 and 32 and is retained therein by extending tabs 34 which are wider than the opening 30 and urged against that opening by spring loaded lever means to be described hereinbelow. The tabs 34 extend laterally from the longitudinal axis of the locking pawl 28 and rest in their normal position on the horizontal, lower edges of apertures 30 and 32. This position is retained to some extent by an inertia mass 36 which is mounted upon one end of the locking pawl 28 to be described more completely in the co-pending patent application by A. Tanaka referenced above.

The inertia mass 36, best seen in FIGS. 2, 3, 4 and 7 comprises the mass 36 attached by a stem 38 to an actuator 40. The stem passes through an aperture within a tab 42 which is separated from the locking pawl 28 by a longitudinal slit 44 and bent at an angle thereto so that the mass 36 hangs vertically toward the frame 14.

As described in U.S. Pat. No. 3,889,898 referred to hereinabove, a sudden deceleration of the vehicle in which the seat belt retractor mechanism 10 is mounted will cause the mass 36 to rotate to the left, FIG. 2, causing the actuator 40 to rotate about its edge. The actuator 40 may directly engage the locking pawl 28, as shown in the '898 patent, for raising the locking pawl by rotating it around its longitudinal axis as shown in FIG. 5. The rotational motion of the locking pawl 28 causes tabs 34 to engage the ratchet teeth 24 for locking the spool 20 and preventing further protraction of the seat belt 26.

An alternative to the embodiment described within the '898 patent is shown herein utilizing a second pawl and ratchet combination. In this combination, the second ratchet 46 is formed from a plastic piece mounted upon shaft 18 on the external side of the housing arm 16, as shown in FIGS. 2 and 6. Each ratchet tooth 48 which forms the second ratchet 46 has a steeper tooth angle which engages a similar tooth 50 on a second pawl 52, FIG. 8. The second pawl 52, which in this embodiment may be a cast plastic piece, is formed with two apertures 54 and 56 for clearing the end of the locking pawl 28. The narrow sections of the second pawl 52 pass through the slots 44 in the end of the locking pawl 28 wherein the angular bend applied to the center of the locking pawl secures the second locking pawl 52 onto position.

Extending at a right angle from the center of the second locking pawl 52 is an actuator engaging tab 58 which contacts the top of actuator 40 attached to the mass 36, FIG. 2. A similar tab 60 extends from the lower end of locking pawl 52 to engage the surface of locking pawl 28 as the second pawl is raised by the action of ratchet teeth 48 on the second ratchet 46. The second ratchet 46 and locking pawl 52 form a programmed pawl retractor with ratchet 22 and pawl 28.

That is, the second ratchet and locking pawl solves a pawl bounce problem similar to the problem solved by the dual lock bar shown in U.S. Pat. No. 3,889,898. As the vehicle in which the seat belt retractor mechanism 10 is mounted is decelerated in an emergency stop, such as a crash, the mass 36 moves to the right or left, FIG. 2 to rotate the actuator 40 and raise the locking pawl 52 through contact with the tab 58. As the locking pawl 52 is raised, tooth 50 engages a ratchet tooth 48 and is drawn upward pulling the first locking pawl 28 with it into engagement with a ratchet tooth 24. The relative position of ratchet teeth 48 with ratchet teeth 22 assures the continued movement of the pawl 28 into engagement with teeth 22 without bouncing back from such engagement. This movement locks the seat belt retractor mechanism 10 to prevent the further protraction of the belt 26. The sharp teeth 48 of the plastic ratchet 46 are such that they will not bounce when engaged by the pawl tooth 50.

Once the inertia mass 36 has caused the locking pawl 28 to engage the ratchet tooth 24, normal vehicle operation permits the mass 36 to return to its vertical position thus permitting the locking pawl 28 to fall from the locked position as soon as tension is relieved on the seat belt 26. However, should the vehicle over turn, the mass 36 may not return to its vertical position thus raising the possibility of locking the seat belt retractor mechanism 10 to prevent further protraction of the seat belt 26. Further, the user may be placing tension upon the seat belt 26 in a post emergency condition to retain the locking pawl 28 against the ratchet tooth 24. In order to eliminate the locked condition thus created, the locking pawl 28 may be moved along its longitudinal axis for changing the alignment of teeth 34 shown in FIG. 3 to the alignment shown in FIG. 4. In the re-aligned condition of FIG. 4, it will be apparent that the tabs 34 no longer engage the ratchet teeth 24 thus permitting the spool 20 which stores seat belt 26 to turn freely.

There are several arrangements which may be used to manually move the locking pawl 28 transversely along its longitudinal axis. The first embodiment, shown in FIGS. 1 and 2, includes a lever 62 formed from two stamped sheet metal parts whose lower sections have been displaced, FIG. 1, and provded with apertures 64, FIG. 2, which fit about tabs 66 that extend inwardly from the locking pawl 28, FIGS. 3 and 4. The lever 62 is attached to the housing 12 by a shaft 68 which passes through a tab 70 that may be formed by stamping and bending metal from the surface of the housing arm 16. The shaft 68 is retained within tab 70 by staking; while an extended shoulder 72 retains the levers 62 in the position shown. A spring 74 urges the lever 62 into a first position wherein the engagement of aperture 64 about locking pawl tab 66 forces the tab 34 against housing 12 to retain the locking pawl 28 therein.

A two-position release handle 76 is attached to a shaft 78 mounted upon the vehicle frame 14 as shown in FIG. 2. Connecting the handle 76 to the lever 62 is a connecting rod 80 which may also be formed from a flexible cable. It will be understood that the handle 76 may be raised against the urging of the spring 74 until the rod 80 passes beyond the center of shaft 78. At this time, the spring 74 tends to lock the handle 76 into the second position shown in phantom in FIG. 2. Rod 80 connects to arms 62 via a slotted aperture 81 so that the independent arms 62 may be returned to their normal operating position separately. This arrangement permits one arm to engage a first pawl 28 even if the alignment of the second pawl 28 and teeth 22 prevents engagement of the second pawl.

Referring now to FIGS. 6 and 7 a second embodiment of the manual release mechanism which imparts a transitional motion to the locking pawl 28 is shown. It will be understood that the inertia mass 36 shown in FIG. 6 is not shown in FIG. 7 to simplify the drawing.

As in the embodiment shown in FIG. 2, a lever 82, FIG. 7, may be formed by a plurality of stamped metal parts, including lower arms 83, joined together to form a bifurcated lower section having apertures 84 which receive tabs 86 extending inwardly from the locking pawls 28, as shown in dotted lines in FIG. 3. The levers 82 and 83, formed by three stamped sheet metal parts, are attached to a shaft 88 which passes through the center of the levers 82 and 83 and a tab 90 extending from the surface of the housing arm 16. The shaft 88 is secured within the levers 82 and 83 and tab 90 by staking the shaft 88 into tab 90. A shoulder 94 on shaft 88 retains the levers in the position shown. A fastener 96 such as a washer and rivet passes through the three stamped sheet metal levers 82 and 83 to complete the subassembly and permit separate motion of the two levers 82 and 83.

The spring 92 urges the levers 82 and 83 into a position which retains the locking pawl 28 with its tabs 34 aligned with the ratchet teeth 24. The upper end of lever 82 may be extended to form a handle which may be manually manipulated to move the lever 82 from the position shown to the second position shown in phantom, FIG. 7. Movement of the lever 82 causes the locking pawl 28 to move along its longitudinal axis for misaligning the tabs 34 from the ratchet teeth 24 and permitting the spool 20 to freely rotate for the production of safety belt 26. As will be seen in FIG. 7, the connecting rod 80 shown in FIG. 2 may be connected to the upper portion of lever 82 to manually actuate that lever. Connecting rod 80 may also be a flexible cable as described above.

As it is normally not desirable to actuate the levers 62 or 82 into the positions shown in phantom in FIGS. 2 and 7, respectively, a safety switch 98 may be provided as shown in FIG. 7. This push button switch is placed in a normally closed position by the movement of the lever 82 against the push button. As is known in the art, depression of the push button switch 98 connects a buzzer, not shown, or other suitable warning device to the battery of the vehicle, for example, to provide a warning to the user that he or she has inadvertently actuated the post emergency spool release of the seat belt retractor mechanism 10.

In operation, the safety belt retractor mechanism 10 is used without the benefit of the locking pawl 28 until an emergency deceleration or crash. At this time the seat belt 26, which was previously free wheeling to permit comfortable use, is locked from further protraction by the motion of inertia mass 36 that causes the actuator 40 to raise the second locking pawl 52 and thus the first locking pawl 28. As the locking pawl 28 is rotated around its longitudinal axis by the motion of the mass 36, the tabs 34 engage ratchet teeth 24 for locking the spool 20 and preventing further protraction of safety belt 26. Once the emergency condition has terminated, the mass 36 normally returns to its vertical position permitting the locking pawl to disengage. Should a post emergency condition exist which would prevent the mass 36 from returning to its vertical position or prevent the locking pawl 28 from returning to its horizontal position, manual post emergency release is necessary. This release is accomplished by activating the lever handle 82 or the handle 76 from the position shown to the second position shown in phantom. Movement of handle 76, for example, causes the lever 62 to push the locking pawl 28 transversely along its longitudinal axis causing the tabs 34 to disengage from ratchet teeth 24 thus freeing the spool 20 to permit protraction of the safety belt 26.

It will be noted that the transverse movement of the locking pawl 28 also disengages the second locking pawl 52 from the second ratchet 46 to free the spool 20 completely.

If for some reason a remote handle 76 is not desired, or if it is felt that a pulling motion is more desirable than a pushing motion, the mechanism shown in FIG. 7 may be utilized wherein the lever 82 is actuated by the extended handle. Alternately, lever 82 may be actuated by the rod 80 connected to the remote handle 76.

The present invention has been described with several devices for actuating the manual release in a post emergency condition and two arrangements for actuating the automatic locking pawl in an emergency condition. Clearly, other modifications and variations of this invention will become apparent to those skilled in the art. Accordingly, the present invention should be limited only by the appended claims.

We claim:

1. In an emergency locking seat belt retractor mechanism including a belt winding spool, at least one spool associated ratchet member having a plurality of ratchet teeth, locking pawl means mounted for engaging the ratchet teeth of said ratchet member on actuation thereof, and emergency responsive means for automatically actuating said pawl means to lock said spool via said ratchet member, the improvement in locking pawl means comprising:

said locking pawl means having a longitudinal axis mounted within said seat belt retractor mechanism for freedom of motion rotationally around the longitudinal axis thereof and freedom of motion transversely along the longitudinal axis thereof, manual unlocking means, said emergency responsive means automatically actuating said locking pawl means into said rotational motion to engage said locking pawl means with said ratchet teeth; and said manual unlocking means manually actuating said locking pawl means into said transverse motion to disengage said locking pawl means from said ratchet teeth, thereby manually unlocking said emergency locking seat belt retractor in a post emergency.

2. In an emergency locking seat belt retractor mechanism, as claimed in claim 1, the improvement in locking pawl means additionally comprising:

said locking pawl formed from a planar member having tab means laterally extending from said longitudinal axis for engaging said ratchet teeth, said laterally extending tab means having a limited width for engaging said ratchet teeth during said rotational motion of said locking pawl means and disengaging said ratchet teeth during said transverse motion of said locking pawl means.

3. In an emergency locking seat belt retractor mechanism, as claimed in claim 1, wherein said manual unlocking means includes:

pivoted lever means mounted upon said seat belt retractor mechanism for motion into a first and second position;

said pivoted lever means attached to said locking pawl means;

spring means for biasing said pivoted lever means into said first position wherein said pawl means engage said ratchet teeth while said pawl means disengage said ratchet teeth in said second lever means position.

4. In an emergency locking seat belt retractor mechanism, as claimed in claim 3, wherein said pivoted lever means includes an extended lever handle for manually actuating said pivoted lever means into said second position against the urging of said spring means.

5. In an emergency locking seat belt retractor mechanism, as claimed in claim 3, wherein said pivoted lever means is mounted upon said seat belt retractor mechanism to engage said locking pawl means with a pushing motion as said pawl means is transversely moved along its longitudinal axis.

6. In an emergency locking seat belt retractor mechanism, as claimed in claim 3, wherein said pivoted lever means is mounted upon said seat belt retractor mechanism to engage said locking pawl means with a pulling motion as said pawl means is transversely moved along its longitudinal axis.

7. In an emergency locking seat belt retractor mechanism, as claimed in claim 3, wherein said manual unlocking means further includes:

a two-position post emergency release handle; and connector means joining said release handle to said pivoted lever means wherein positioning said release handle in a first position places said pivoted lever means in its said first position while positioning said release handle in a second position places said pivoted lever means in its said second position.

8. In an emergency locking seat belt retractor mechanism, as claimed in claim 7, wherein said manual unlocking means further includes switch actuated warning means having a switch mounted upon said seat belt retractor mechanism aligned with said pivoted lever means for actuation when said pivoted lever means is in said second position.

9. In an emergency locking seat belt retractor mechanism, as claimed in claim 7, wherein said two position release handle includes an over the center second position to overcome the urging of said spring means against said pivoted lever means.

10. In a seat belt retractor mechanism including a belt winding spool having a ratchet member associated therewith and a locking pawl for engaging said ratchet member in an emergency condition, the improvement comprising:

said locking pawl having a longitudinal axis mounted within said retractor for rotational motion about said longitudinal axis during said emergency condition and mounted in said retractor for longitudinal motion parallel to said longitudinal axis during a post emergency condition, first means for moving said locking pawl during said emergency condition, and second means for moving said locking pawl during said post emergency condition.

11. In a seat belt retractor, as claimed in claim 10, wherein said first means is an inertia sensitive means for moving said locking pawl and said second means is a manual means for moving said locking pawl.

* * * * *